INVENTOR.
RALPH O. VUILLEUMIER
ATTORNEYS.

United States Patent Office 3,582,431
Patented June 1, 1971

3,582,431
ELECTRICAL HEATING DEVICE
Ralph O. Vuilleumier, Malvern, Pa., assignor to Container Corporation of America, Chicago, Ill.
Filed Mar. 13, 1969, Ser. No. 807,009
Int. Cl. B29c 19/02
U.S. Cl. 156—380　　　　　　　　　　　　2 Claims

ABSTRACT OF THE DISCLOSURE

In a machine for bonding together a pair of paperboard surfaces at least one of which is coated with heat-activatable adhesive compound, a device for supplying heat to the coated surface and thereby activating the compound comprises a source of electrical energy, at least a pair of electrodes operatively connected to the source and located adjacent the coated surface, each of the electrodes having a discharge tip spaced a slight distance from the discharge tip of the other electrode to provide therebetween a gap of predetermined dimension, and means for controlling the source of energy to provide an electrical discharge across the gap and thereby supply heat to the coated surface.

BACKGROUND OF THE INVENTION

(1) Field of the invention

This invention relates to a device used with a paperboard container closing or sealing machine, or the like, and, more particularly, to a device adapted to supply heat to selected surfaces of a container for activating an adhesive compound on these surfaces prior to closing of the container.

(2) The prior art

It is a general practice in the paperboard container manufacturing art to coat one or more container surfaces to be closed with heat-activatable adhesive compound prior to closing of the container. Closing of the container is normally accomplished on a sealing, closing, or similar machine. Before a container can be closed, it becomes necessary to supply heat against the surfaces of the container so as to activate the adhesive compound.

The prior art discloses a variety of devices which force heated air against coated surfaces of a container. Normally, the devices known in the art utilize air heaters and nozzles through which the heated air is forced against the surfaces of the container in question. Such devices have been found to be bulky and require a considerable warm-up time after starting before they can be used for the intended purpose. When the container closing machine stops, due to a jam of containers, or the like, and the heated air is continued to be forced against the surfaces of a stationary container, substantial danger of fire is presented. The prior art, while disclosing a number of means designed to cut the heated air supply from container surfaces when the machine is stopped, does not disclose any uncomplicated means which may become operative without time delay.

SUMMARY OF THE INVENTION

The present invention overcomes the disadvantages of the prior art and provides a device which is simple, efficient, and becomes fully operative or, in case of a malfunction of the machine—completely inoperative, without any time delay. Generally, the device of the present invention is incorporated into a container closing machine which has a conveyor on which containers are being carried through the machine for the purpose of closing them. Container surfaces to be closed are usually coated with an adhesive compound which must be activated by heat before it becomes effective. The device of the present invention comprises a source of electrical energy and at least a pair of electrodes operatively connected thereto and located adjacent the coated surfaces of the container. Each of the electrodes has a discharge tip which is spaced a slight distance from a discharge tip of the other electrode to provide therebetween a gap of desired dimension. By controlling the source of electrical energy, an electrical discharge is produced across the gap and adjacent the coated surface of the container to supply the necessary heat to the coated surface and to activate the compound. If the machine is malfunctioning, the source of electrical energy may be de-energized responsive to the stoppage of conveyor, or the like, to prevent any possibility of overheating of containers held on a stopped conveyor.

DRAWING

Figure 1:
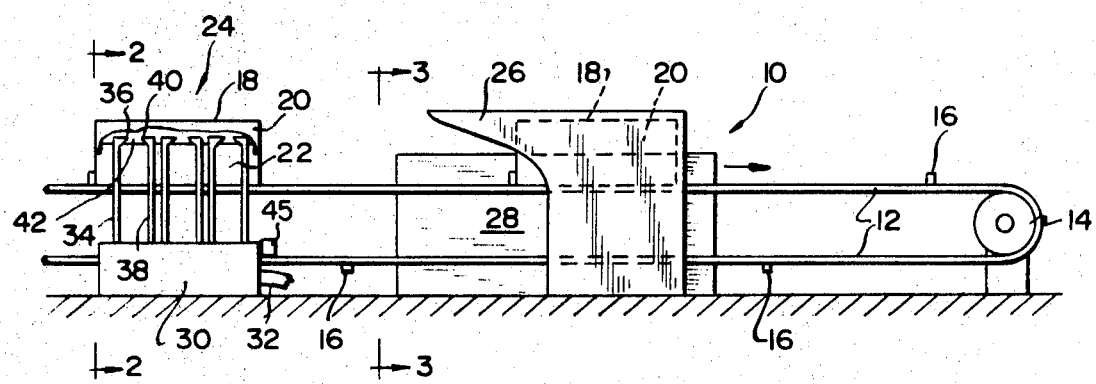
FIG. 1 is a side elevational view of a portion of a container closing machine incorporating the device of the present invention.

While this invention is susceptible of embodiment in many different forms, there is shown in the drawing and will herein be described in detail, an embodiment of the invention with the understanding that the present disclosure is to be considered as an exemplification of the principles of the invention and is not intended to limit the invention to the embodiment illustrated. The scope of the invention will be pointed out in the appended claims.

Referring now to the drawing for the illustrative embodiment of the present invention, a portion of a typical container closing machine is illustrated in FIG. 1 and generally designated 10. The machine has a conveyor 12 extending between sprockets or rollers 14 (only one of the rollers being shown), suitably driven by conventional driving means, not shown. The conveyor 12 has a plurality of pusher elements 16 which advance the containers through the machine. If desired, pushers 16 may be replaced by brackets or other means for advancing the containers through the machine.

Figure 2:
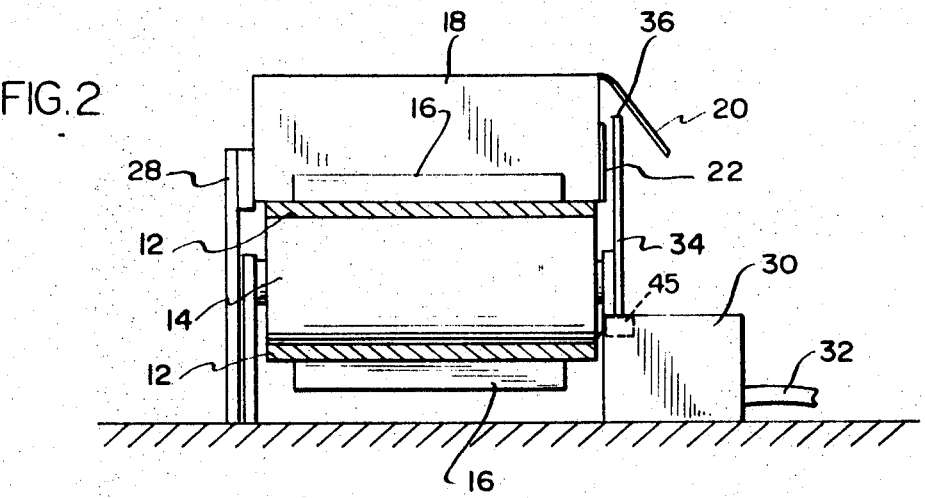
FIG. 2 is a sectional view, on an enlarged scale, taken generally along the line 2—2 of FIG. 1.
Figure 3:
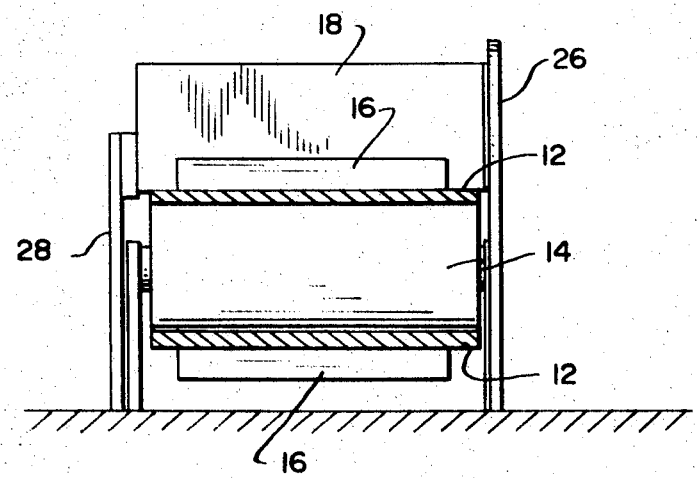
FIG. 3 is a sectional view, on an enlarged scale, taken generally along the line 3—3 of FIG. 1.

A paperboard container 18, as best seen in FIG. 2, has an outer end flap 20 and an inner end flap 22. Normally, the inner surface of the outer flap 20 and the outer surface of the inner flap 22 is coated with heat-activatable adhesive compound, or the like. Sometimes, it is sufficient to coat only the surface of one of these flaps.

The compound is activated by application of heat which is accomplished by operation of a heat-supplying device or unit 24 to be discussed in detail later. Positioned downstream from the unit 24 there is a plow element 26 which engages the outer flap 20 of the container 18, as the container is being carried past the plow element, and moves the flap 20 against the inner flap 22 thereby closing the container. The opposite end of the container may be supported by a support 18, or the like, or the support may be eliminated and another plow element, similar to the element 26, may be positioned on the opposite side of the machine in the event that both ends of the container have to be closed. In the latter case, a second heat-supplying unit should also be positioned on the opposite side of the machine in line with and similar to the unit 24 shown in FIG. 1.

The heat-supplying unit 24 has a plurality of electrical transformers and controls, generally designated 30, which are operatively connected to a conventional source of electrical energy (not shown) by conduit 32, or the like. One or more pairs of electrodes are connected to the transformer control unit 30 and are positioned along the path of the container as the container travels through the machine.

While the illustrative embodiment hereof shows three pairs of electrodes, any number of pairs may be utilized without departing from the spirit of the invention.

As viewed in FIG. 1, each pair of electrodes has a first electrode 34 with a discharge tip 36 and a second electrode 38 with a discharge tip 40. The discharge tips 36 and 40 are spaced a slight distance from each other to provide therebetween a gap 42 of predetermined dimension.

When electrical energy is supplied to the electrodes, an electrical discharge takes place across the gap 42 and between the discharge tips 36 and 40 to supply heat to the surfaces of paperboard to be bonded or sealed.

As best seen in FIG. 2 the discharge tips 36 and 40 of the electrodes 34 and 38, respectively, are interposed between the flaps, or surfaces, 20 and 22 so that when electrical discharge takes place through the tips 36 and 40, a spark is generated in the gap 42 to provide a sufficient amount of heat necessary to activate the adhesive compound applied to one or both of the flaps 20 and 22.

The operation of the unit 24 is tied in and made to be responsive to the operation of the machine, more specifically, to the operation of conveyor 12. A sensing switch 45, or the like, is mounted adjacent the conveyor 12 and is operatively connected to the conveyor and to the electrical controls 30. When the conveyor 12 is in operation, the switch 45 will operate to actuate the controls 30 so as to cause the electrical energy to be supplied to the electrodes for providing the necessary discharge in the gap 42. But, on the other hand, when a container jam occurs stopping the conveyor, the switch 45 will interrupt the operation of controls 30 and electrical energy will not be transmitted to the electrodes so that a discharge will not take place. As stated heretofore, a danger of fire is presented in a container closing machine, when containers are jammed and stopped in front of or adjacent to the heat-supplying unit since application of excessive heat to the surfaces of a container may cause a fire. By making the heat supply unit 24 operate in response to the operation of conveyor 12, such danger of fire is eliminated since no electrical discharge and, therefore, no heat will be supplied to the surfaces of the container when the conveyor is not in operation.

I claim:
1. In a machine for bonding together a pair of paperboard surfaces at least one of which is coated with heat-activatable adhesive compound, a device for supplying heat to said coated surface for activating said compound, the improvement comprising:
  (a) a source of electrical energy;
  (b) at least a pair of electrodes operatively connected to said source and interposed between the surfaces to be bonded;
  (c) each of the electrodes having a discharge tip spaced a slight distance from each other to provide therebetween a gap of predetermined dimension;
  (d) means for controlling said source to provide an electrical discharge across said gap for supplying heat to said coated surface.

2. In a machine for bonding together a pair of paperboard surfaces of a container carried through the machine by a conveyor, at least one of the surfaces being coated with heat activatable adhesive compound, a device for supplying heat to said coated surface for activating said compound, the improvement comprising:
  (a) a source of electrical energy;
  (b) at least a pair of electrodes operatively connected to said source and interposed between said surfaces to be bonded;
  (c) each of the electrodes having a discharge tip spaced a slight distance from each other to provide therebetween a gap of predetermined dimension;
  (d) means responsive to the operation of said conveyor for activating said source to provide an electrical discharge across said gap for supplying heat to said coated surface.

References Cited

UNITED STATES PATENTS

| | | | |
|---|---|---|---|
| 2,631,642 | 3/1953 | Richardson et al. | 156—499X |
| 2,796,912 | 6/1957 | Bartoss | 156—380X |
| 3,095,344 | 6/1963 | Sandow | 156—499X |
| 3,340,125 | 9/1967 | Drenning et al. | 156—274 |
| 3,380,229 | 4/1968 | Nelson | 53—375 |
| 3,431,380 | 3/1969 | Sutliff et al. | 156—380 |

JOSEPH V. TRUHE, Primary Examiner

C. L. ALBRITTON, Assistant Examiner

U.S. Cl. X.R.

156—272; 219—200, 383